United States Patent [19]

Lula et al.

[11] 4,000,373
[45] Dec. 28, 1976

[54] STRIP ELECTRODE FOR OVERLAY WELDING

[75] Inventors: Remus A. Lula, Natrona Heights; Donald J. McMahon, Export, both of Pa.

[73] Assignee: Allegheny Ludlum Industries, Inc., Pittsburgh, Pa.

[22] Filed: Feb. 24, 1975

[21] Appl. No.: 552,460

[52] U.S. Cl. .............................. 219/145; 219/76; 219/146
[51] Int. Cl.² ........................................ B23K 35/22
[58] Field of Search ............... 148/38; 219/73, 76, 219/137 UM, 145, 146

[56] References Cited

UNITED STATES PATENTS

| | | | |
|---|---|---|---|
| 1,797,289 | 3/1931 | Kotchi | 219/146 |
| 2,319,977 | 5/1943 | Cape et al. | 219/76 |
| 2,481,385 | 9/1949 | Bloom | 148/38 X |
| 3,078,363 | 2/1963 | Johnson | 219/145 X |
| 3,495,069 | 2/1970 | Cavanagh et al. | 219/146 |
| 3,751,628 | 8/1973 | Scherl | 219/73 X |
| R26,225 | 6/1967 | Kasak et al. | 148/38 X |

OTHER PUBLICATIONS

W. T. DeLong, "Ferrite in Austenitic Stainless Steel Weld Metal," *Welding Research Supplement* to *Welding Journal*, July 1974, pp. 273-286.

*Primary Examiner*—J. V. Truhe
*Assistant Examiner*—N. D. Herkamp
*Attorney, Agent, or Firm*—Vincent G. Gioia; Robert F. Dropkin

[57] ABSTRACT

There is disclosed an electrode for overlay welding made up of laminations. All of the laminations are composited to be hot workable; and they may be austenitic stainless steel, ferritic stainless steel, duplex structures that are hot workable, or pure metals such as chromium. The combined composition of all laminations, when they are melted and resolidified, will contain at least 2%w of delta ferrite.

10 Claims, No Drawings

STRIP ELECTRODE FOR OVERLAY WELDING

BACKGROUND OF THE INVENTION

Cladding of lower alloyed steels with stainless steel surface layers is a widely used method of cost saving in the construction of industrial equipment that must be resistant to corrosion. The stainless steel layer may be bonded to a base material — such as carbon steel — by rolling, by explosion bonding, or even by casting bimetallic ingots and rolling them. All of these methods are limited to simple shapes, such as plates, and cannot be readily used where the clad material must be fabricated by such methods as casting or welding.

An economical and versatile method for cladding is the method known as overlay welding. In this method, a layer of stainless steel is applied to a base material by melting the stainless steel onto the surface of the base material by welding techniques. Newer overlay welding techniques have developed to the point where electrodes in the shape of strips or ribbons are used instead of electrodes in the shape of bars or wire in that covering the surface completely can be accomplished much more readily employing strip electrodes. The metal deposition rate can be higher when using strip electrodes because the larger cross-section area of strip permits carrying higher currents.

Use of overlay welding is increasing, particularly in industries where corrosion-resistant storage vessels are employed. One difficulty with overlay welding is that the austenitic stainless steels are difficult to apply to a base material by overlay welding techniques because the austenitic stainless steel is subject to hot cracking when applied by overlay welding. Experience has shown that stainless steel containing some delta ferrite is much less susceptible to cracking compared to austenitic stainless steel, or not susceptible to cracking at all when used for overlay welding. Unfortunately, austenitic stainless steel having a separate delta ferrite phase within it is so difficult to hot work that manufacturing of electrodes of this material is very expensive. The difficulty in hot working stainless steel increases with increasing amounts of delta ferrite up to where ferrite becomes the continuous phase.

THE INVENTION

The present invention is an electrode that is readily fabricated by ordinary techniques; but one which, when employed in an overlay welding process, produces a cladding of austenitic stainless steel having from about 2%w to about 35%w of a separate delta ferrite phase within it. In this specification and the appended claims the designation %w shall mean percent by weight. This invention is a composite electrode made up of a number of laminations, each of which is readily hot worked. The laminations are such that their composite composition is one which, upon melting of all laminations and resolidifying the resultant molten alloy, will produce an alloy having austenitic structure and containing from about 2%w to about 35%w of a separate delta ferrite phase.

As used in this specification and in the appended claims, the term lamination is defined as a layer — whether flat layers of a multi-component strip or concentric layers of a multi-component wire or bar. For purposes of this specification, the core of an electrode having a round cross section will also be defined as a lamination, although it may also be referred to as a core.

In the electrode of this invention, any number of laminations may be employed. If the laminations forming the strip electrode of this invention are in the form of a flat strip, they may be joined by rolling, explosive bonding, or even by being poured as composite ingots and subsequently rolled, or by other means that are known to the art for bonding two pieces of metal together. Flat strip electrodes may also be prepared by plating one metal on another. It is preferred that three laminations or more be employed to insure that the strip electrode of this invention will fuse into a homogeneous liquid and to avoid such problems as curling if the different metals have different coefficients of thermal expansion or different rolling characteristics. When an electrode having circular cross section is used, it is preferred that the outer laminations be deposited by plating, although other methods for making concentric layers may be employed such as sputtering, vapor deposition or gaseous deposition; and the laminated, circular electrode may then be drawn to gauge if desired.

The composition of the final cladding produced by overlay welding is determined both by the composition of laminations and their thicknesses. The final weld compositions can readily be calculated by taking these factors into consideration.

At least one of the laminations of the electrode of this invention is austenitic stainless steel, and these will hereinafter be referred to as first laminations. The first laminations may be of such well known stainless steels as those known to the art as 304L, 308L, 309L or 316L. While these stainless steels are considered to be austenitic, they must be selected to avoid a few compositions within their broad ranges which form delta ferrite at high temperatures and become difficult to hot roll. It is speculated that even small amounts of delta ferrite in austenitic stainless steels make those steels difficult to hot roll because the softer, discontinuous delta ferrite separates to form cracks. However, when delta ferrite is present in large quantities, approaching 50%w, the delta ferrite phase is either continuous or very close to being continuous, and the duplex alloy structure is readily hot workable.

The duplex structure having from about 2%w to about 35%w delta ferrite is best for overlay welding, but it is the most difficult to hot roll. Accordingly, if the laminations in the electrode of this invention comprise one lamination of readily rollable austenitic stainless steel and one lamination of readily rollable delta ferrite, or duplex steel having large amounts of delta ferrite, or pure chromium, then the composite melted and resolidified overlay weld material will be austenitic stainless steel having a discontinuous delta ferrite phase within it.

The amount of delta ferrite in any given composition can be readily determined from the literature. For example, the Schaeffler diagram (which can be found in an article entitled "Ferrite In Austenitic Stainless Steel Weld Metal" by W. T. DeLong which was a 1974 Adam Lecture published in the *Welding Research Supplement* to the *Welding Journal*, July 1974, pages 273–286 provides information which will permit one skilled in the art to determine the amount of delta ferrite that will be in any given composition. Accordingly, if a known amount of austenitic stainless steel is provided in the first laminations or in the core of a wire and the amount of delta ferrite needed in the cladding produced by weld overlay techniques is known, publications such as the Schaeffler diagram or equivalent sources of information may be employed to select the composition needed in the alloy employed as the second lamination. Obviously, this invention is not limited to two metals or alloys, and it includes the use of laminations of flux materials where such are desired.

To exemplify the invention, reference to the Schaeffler diagram indicates that the following alloy will contain approximately 15%w delta ferrite.

| C | N | Si | Mn | Cr | Ni | Fe & Residuals |
|---|---|---|---|---|---|---|
| 0.015 max. | 0.03 | 0.2 | 1.50 | 22.6 | 10.40 | Balance |

The composition set forth above would have such poor hot rolling characteristics that it would be extremely difficult and, accordingly, extremely expensive to produce it in the form of a thin strip suitable as an electrode for overlay welding or as weld wire. In accordance with this invention, the above-noted alloy is prepared by using a composite electrode having first laminations of type 304 stainless steel which has the following composition.

| C | N | Si | Mn | Cr | Ni | Fe & Residuals |
|---|---|---|---|---|---|---|
| 0.015 max. | 0.03 | 0.2 | 1.5 | 18.5 | 10.0 | Balance |

Second laminations should be of an alloy containing very large amounts of ferrite and one which is easily hot worked. One such alloy contains 34%w chromium, 12%w nickel, 0.7%w manganese, and the balance iron and residuals. It is easily calculated that a composite electrode wherein type 304 stainless steel constitutes 70% of its thickness and the ferrite-containing alloy constitutes 30% of its thickness will produce the desired ferrite-containing overlay metal set forth above. It is preferred that the electrode be constituted so that it consists of three laminations with two of the laminations being type 304 stainless steel. Each of the stainless steel laminations is 35% of the total thickness of the electrode, and sandwiched between them is a layer of the ferrite-containing alloy that constitutes 30% of the thickness of the total electrode. An electrode such as this may be prepared by cold rolling the components together, followed by a diffusion anneal to insure bonding, or by welding the ends of a three-layer stack together and hot rolling the three-layer stack to reduce its thickness to one suitable for further cold rolling to final gauge.

The final overlay composition that contains about 15%w delta ferrite, as set forth above, may also be prepared starting with type 310 austenitic stainless steel. Type 310 stainless steel has the following composition.

| C | N | Si | Mn | Cr | Ni | Fe & Residuals |
|---|---|---|---|---|---|---|
| 0.2 max. | 0.03 max. | 0.2 | 1.5 | 25 | 20 | Balance |

To provide an overlay composition as set forth above, a composite alloy consisting of 50% of its thickness type 310 stainless steel and 50% of a second alloy having the following composition will produce the desired overlay composition.

| C | N | Si | Mn | Cr | Ni | Fe & Residuals |
|---|---|---|---|---|---|---|
| 0.01 max. | 0.03 max. | 0.2 | 1.5 | 20.0 | 0.25 max. | Balance |

The electrode may be round or flat and may be made as a two-lamination electrode, or it may be made with as many laminations as desired. Again, the preferred electrode is a flat, three-lamination electrode having two laminations each constituting 25% of its thickness and a central lamination constituting 50% of its thickness. Either the type 310 alloy or the second alloy may constitute the outside laminations. Again, the electrode may be prepared by cold rolling the three components or by laying up a three-layer sandwich, welding the front end of the three strips together, followed by hot rolling and cold rolling to the desired final gauge. It is not essential that the bonds between laminations be extremely strong so long as they will resist the stresses involved in use as a welding electrode and so long as the bonds are suitably electrically conductive.

A weld containing 15% delta ferrite may be produced from a weld wire made from an iron alloy containing 19%w chromium and 10.88%w nickel, which is an alloy that is easy to hot work. This alloy is drawn to a wire having a diameter of 0.05867 inch and plated with chromium, using conventional techniques to produce a chromium lamination approximately 0.000666 inch thick on the core wire. Melting and resolidification of the electrode will provide an overlay weld containing about 15% delta ferrite.

What is claimed is:

1. An electrode for overlay welding which comprises a plurality of laminations including at least a first lamination of austenitic stainless steel and at least one other lamination being composited such that when said electrode melts and resolidifies, the resolidified metal will contain at least 2%w delta ferrite.

2. The electrode of claim 1 wherein said resolidified metal will contain at least 5%w delta ferrite.

3. The electrode of claim 1 in the form of a flat strip.

4. The electrode of claim 1 with a round cross section.

5. The electrode of claim 1 wherein said other lamination comprises an iron alloy that is at least 50%w delta ferrite.

6. The electrode of claim 1 wherein said other lamination comprises at least 15% chromium, at least 1.0% manganese, and not more than 1.0% nickel.

7. The electrode of claim 1 wherein said other lamination is chromium.

8. The electrode of claim 1 in the form of a flat strip and comprising three laminations with the outer laminations being the same alloy.

9. The electrode of claim 1 wherein said austenitic stainless steel alloy is type 304 stainless steel, and said other lamination comprises 12% nickel, 34% chromium, 0.7% manganese, and the balance iron and residuals.

10. The electrode of claim 1 wherein said austenitic alloys is type 310 stainless steel, and said other alloy comprises 20% chromium, 1.5% manganese, and the balance iron and residuals.

* * * * *